Sept. 2, 1958   R. THUM ET AL   2,849,837
DEVICE FOR REDUCING THE UNDULATIONS IN
A GLASS STRIP CONTINUOUSLY DRAWN
FROM THE GLASS MELT
Filed March 15, 1954   2 Sheets-Sheet 2

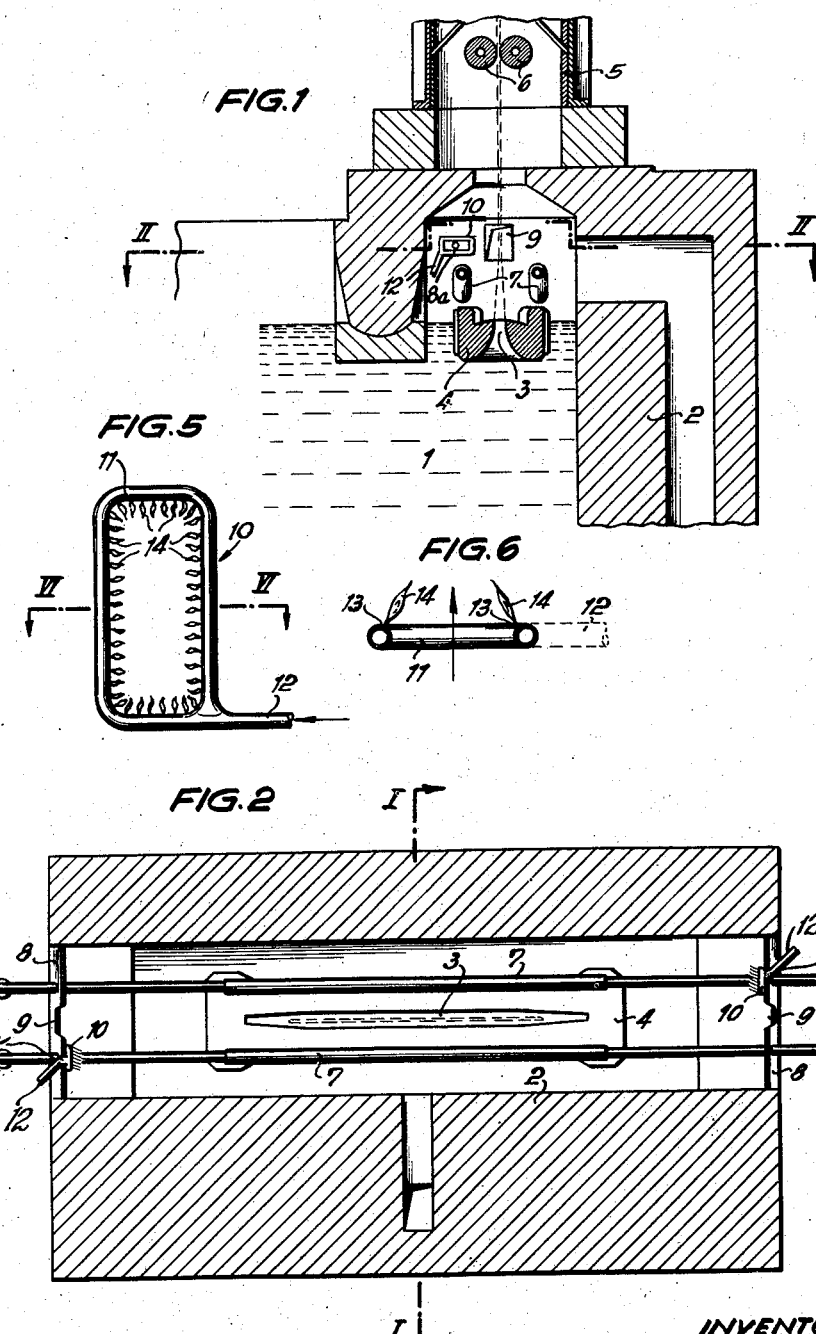

INVENTOR
R. Thum
R. Ramsauer
G. Kilian
ATTYS.

United States Patent Office 2,849,837
Patented Sept. 2, 1958

2,849,837

DEVICE FOR REDUCING THE UNDULATIONS IN A GLASS STRIP CONTINUOUSLY DRAWN FROM THE GLASS MELT

Rudolf Thum, Rembert Ramsauer, and Georg Kilian, Witten (Ruhr), Germany, assignors to Deutsche Tafelglas Aktiengesellschaft, Furth, Bavaria, Germany, a German company Application March 15, 1954, Serial No. 416,362

Claims priority, application Germany March 27, 1953

2 Claims. (Cl. 49—17)

In the manufacture of sheet glass according to the drawing process defects occur in the optical properties of the glass, irrespective of the process employed, which defects are due to faults in the flatness of the two surfaces. Generally, these defects show themselves in the form of waves or undulations running in the direction in which the glass sheet is drawn. These drawing waves lower the quality of the drawn sheet glass, since when looking through the glass in an inclined direction, or in the case of inclined reflection, they produce optical distortions.

The optical defects of continuously drawn glass sheet may be due to different causes. The defects may be associated with properties of the molten glass coming from the glass tank. When the melt is not homogeneous thermally or chemically, this shows itself as more or less strong streaks. These optical defects due to the lack of homogeneity of the molten glass can be influenced only immaterially by measures taken above the glass level, during or after the shaping process.

A second group of optical defects is connected directly with the drawing process, and it occurs also in the case of glass which is entirely homogeneous. The object of the present invention is to avoid or substantially reduce or eliminate the drawing waves in the sheet glass due to influences above the glass level.

Endeavours to reduce these waves were made long ago. Especially in the case of the Fourcault process it was recognised, immediately after its general practical application, that an air current which enters into the drawing chamber through the inspection windows provided on the narrow sides, and is directed transversely to the rising glass sheet, can influence the waves favourably, by this current of air allowing a transverse structure to be produced. In the special case when the inspection windows are opened on both sides to approximately the same extent, there is produced the so-called "pine-tree structure" in which the waves appear faded.

By using the knowledge that the waves are influenced by the transverse current of air, it was further proposed to circulate a gaseous medium within the drawing chamber, preferably adjacent the meniscus of the rising glass, in contact with the glass surface, passing from the one edge to the other edge, transversely across the width of the glass sheet, and parallel to the glass surface, and it was considered to be especially advantageous to produce the covering of gaseous medium surrounding the glass sheet by two blowing devices in the drawing chamber or at a low point of the leer, these devices lying inclined with respect to the glass sheet opposite each other, and being arranged laterally with respect to the glass sheet, and acting parallel to the glass surfaces. For the circulating transverse air current, fresh air or a mixture of fresh air and chamber or furnace gases was used.

The circulation of the transverse air current produced by this method around the glass sheet causes on opposite sides of the ascending glass sheet temperatures which are greatly different from one another, and consequently different strain in the sheet glass, and in addition thereto, this kind of circulation produces other defects.

In order to avoid these disadvantages, it has been proposed to move a gas, again preferably adjacent the meniscus, on both sides of the glass sheet transversely over the whole width thereof in one and the same direction. Also in this case, use was made of fresh air or of a mixture of fresh air and chamber or furnace gases for the production of the transverse current.

As an improvement of the last mentioned process it has been proposed to admit atmospheric air, or air preferably preheated to 374° F., through a narrow side wall of the drawing chamber on both sides of the glass sheet near the meniscus of the sheet glass and to draw it off on the opposite side. During the passage through the drawing chamber, the preheated gas was supposed to be thereby heated to about 536° F. Metal shields incorporated along the whole length of the drawing chamber were intended to prevent stray air currents from impinging on the transversely directed air current; care being taken that the ascending air will be kept away from the rising glass sheet.

First of all, it is to be pointed out that the arrangement of metal shields extending over the whole length of the drawing chamber is a disadvantage, since they are easily distorted and scale owing to the high temperatures in the drawing chamber. If, however, the proposed metal shields are not used, then no satisfactory improvement in the optical properties of the glass is obtained, when use is made of transverse air currents, consisting of fresh air or moderately preheated gases, that surround the sheet glass, whether the same are led in countercurrent or in the same direction on both sides of the sheet glass adjacent the meniscus.

It is also known, in order to decrease the waves in the region of the so-called zone of the formation of waves, which begins, for instance in the case of the Fourcault process, slightly above the meniscus and extends to above the upper edge of the main water coolers, to retard or render ineffective the cooling of the glass sheet by reflecting especially the outer layers against the coolers by special adjustable means that act as uniformly as possible over the entire width of the glass sheet. Also in this case it is not possible to prevent the deformation of the insertions which extend over the entire length of the drawing chamber. However, if such distortions take place, new sources of defect are produced which contribute to the formation of the waves.

The object of the invention is to provide an improved effective and reliable process of reducing optical defects in the glass by very simple means while avoiding the use of metal shields extending over the entire length of the drawing chamber.

Extensive tests have shown that gas currents, which are led along both sides of the glass sheet transversely to the drawing direction, in the same direction of flow or in countercurrent, can be used for a reliable improvement of the optical properties of the glass, if the gases which are introduced into the drawing chamber are heated above 482° F., preferably to at least the average gas temperature in the drawing chamber. Naturally, the improvement in the optical properties depends also upon the amount and the speed of the highly heated gases which are introduced into the drawing chamber. The amount and speed of the highly heated gases that are introduced depend upon the special construction of the plant and, in the case of one and the same machine also upon the thickness of the glass and the age of the machine. However, the best conditions of operation can be readily adjusted purely empirically. Also the optimum temperature of the gases that are introduced can be easily empirically adjusted. If an inclined structure is obtained, it is only necessary to further increase the temperature until the same largely disappears.

In the case of the Fourcault machines, temperatures of about 752° F. of the gases introduced into the drawing chamber have been found to be especially suitable with a definite glass composition and definite thickness of the glass.

The expression "gas" in the present application and in the claims is understood to refer to a gas of any suitable composition, for instance highly heated air, furnace or chamber gases, and also a mixture of the two or a mixture of air and the combustion gases of flames.

It has been found that the gas currents flowing transversely to the drawing direction on both sides of the glass sheet running in one and the same direction or in countercurrent do not need to run exactly parallel to the glass sheet; the gas current may flow also as a certain angle to the glass sheet in a horizontal as well as in a vertical direction.

A further important feature of the invention consists in that the gases are introduced into the drawing chamber already in an eddying condition. If the gases are introduced into the drawing chamber while eddying, the temperature in the drawing chamber along the glass sheet can be rendered uniform especially effectively and the cold, strand-like air that entered therein, due to lack of air-tightness or from the leer, is displaced or is strongly intermixed with the other gases.

It is also important that the introduction of the gases be effected in such a way that they flow along mainly between the water coolers and the wall of the drawing chamber and above the coolers between the glass sheet and the wall of the drawing chamber. It has been found, that it is in no way adequate or advantageous to produce a flow transversely to the drawing direction of the glass band adjacent the meniscus of the rising glass sheet, that is to say approximately between the glass sheet and the water coolers, and that it is necessary to supply the gas currents in such a way, that the whole cross-section of the drawing chamber, viz., also the space between the coolers and the walls of the drawing chamber, is thereby influenced, and the main part of the gas current strikes the glass sheet, preferably in the upper part of the zone where the waves are formed, above the upper edge of the coolers.

In the case of especially wide glass sheets it may be advantageous to draw off the gases that have been introduced on the side lying opposite the inlet opening in a manner known per se, in order to ensure that the drawing chamber will be traversed between the two edges of the glass sheet.

The same purpose can be attained by this that the gases that are introduced are influenced on the side lying opposite the inlet opening, in the proximity of the edge of the glass sheet, by a vertically ascending, preferably heated, gas current which extends from the glass sheet to preferably the wall of the drawing chamber. This vertically ascending gas current may be produced by combustion gases of a flame pipe or by gases passing through a slotted pipe. This pipe may be arranged horizontally or vertically in the proximity of the edge of the glass sheet; in the latter case by means of a series of flames which are upwardly inclined.

The gases which are introduced into the drawing chamber are preferably heated to the required temperature by means of a source of heat which is arranged approximately in the plane of the narrow sides of the drawing chamber, or within the latter between its narrow sides and the edges of the glass sheet.

It is especially advantageous to heat the gases by means of burner rings surrounding the gas current entering the drawing chamber. These burner rings act in an injector-like manner on the gas current that is supplied and assist the suction already exerted by the drawing chamber upon the gas current. With the heating of the gas current by the burner rings an eddying current is produced at the same time.

Preferably, the flames of the burner rings are inclined with respect to the current of gas at an angle of preferably 60°. If the adequate amount of gas cannot be obtained by means of one burner ring two or more such rings may be arranged in parallel or in series. Preferably, in each burner ring the flames, which are inclined relatively to one another, are so arranged that they lie in gaps, since in this way a better eddying, and a uniform heating of the gas current over the whole cross-section, is obtained.

The temperature of the sources of heat as well as the supply of the amount of gas are preferably adjustable.

The accompanying drawing illustrates, by way of example, a suitable construction according to the improved process.

Figure 1 shows in section along the line I—I of Figure 2 a drawing machine of a kind known per se, working according to the Fourcault process;

Figure 2 shows a section of the same machine along the line II—II of Figure 1;

Figure 5 shows in elevation a source of heat consisting of burner pipes; and

Figure 6 shows the same device in section along the line VI—VI of Figure 5.

Figure 3:
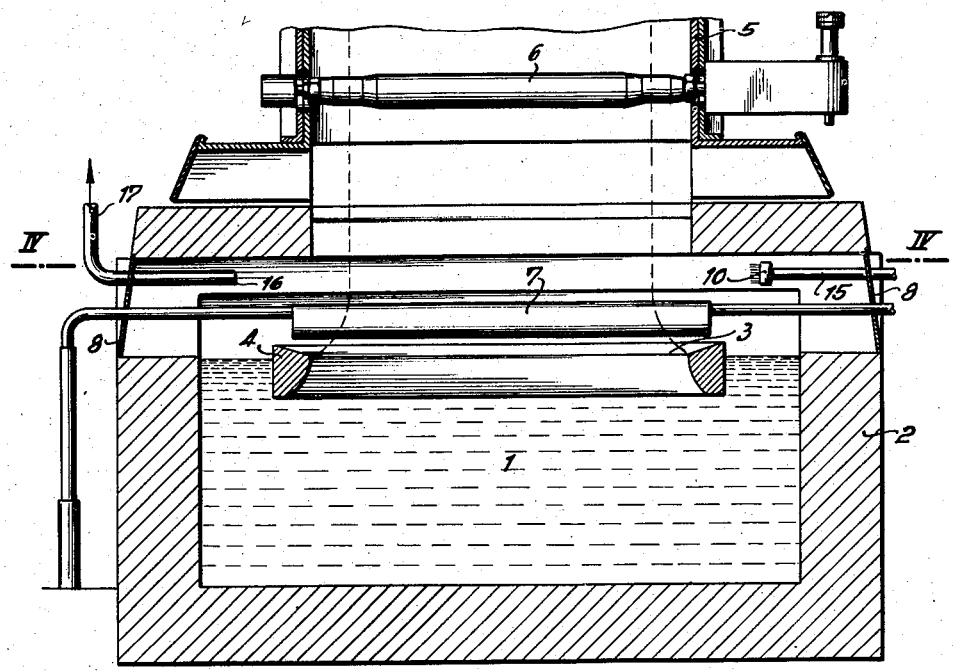
Figure 3 shows in section along the line III—III of Figure 4 a modified drawing machine, likewise working according to the Fourcault process.

Referring to Figures 1 to 4, showing the drawing machine working according to the Fourcault process, 1 is the molten glass present in the drawing tank 2, which molten glass is continuously drawn upwardly in the form of a glass sheet through a slot 3 provided in the débiteuse 4. The glass sheet, which solidifies in the drawing chamber above the débiteuse 4, is gripped in the leer 5 by pairs of rolls 6, arranged one above the other, and is conveyed upwards. Above the débiteuse 4, water coolers 7 are arranged in a known manner at a certain distance from the glass sheet, which coolers extend at least along the length of the slot 3 of the débiteuse 4. The drawing chamber is closed on the narrow sides by metal shields 8, which are provided in the axis of the slot 3 above the water coolers 7 with inspection glass windows 9.

In the machine shown in Figures 1 and 2, there is mounted on both sides of the longitudinal axis of the slot 3 of the débiteuse 4, diametrically opposite to each other on the metal shields 8, burners 10 in the form of burner rings, which are for instance constituted by burner pipes 11, as shown in Figures 5 and 6. The burners 10 are located in the drawing chamber at a greater distance from the vertical axis of symmetry of the sheet than are the edges of the sheet. The burners are located beyond the ends of the coolers 7. Combustible gas is supplied to these pipes by the supply pipe 12. Atmospheric air enters into the drawing chamber from outside through the burner rings through suitable openings 8a in the metal shields 8. The inflow of air is effected in a manner known per se due to the reduced pressure in the drawing chamber.

Preferably, the openings 13 of the burners in the pipes 11 are so shaped and arranged that the flames 14 are inclined in the direction of the gas current at an angle of preferably 60°. Owing to this arrangement of the burner rings an injection like effect is exerted upon the inflowing current of air, which assists the suction action of the drawing chamber.

Naturally, instead of the burner pipes 11, use may be made of other sources of heat, for instance of electrical heating devices. Also the shape of the opening in the metal shields 8 surrounded by the burner pipes may be adapted to the prevailing conditions.

If the required amount of gas cannot be obtained with one burner ring two or more such rings may be arranged in parallel or in series.

The sources of heat 10 are so dimensioned that the gases entering into the drawing chamber are heated over 482° F., preferably at least to the medium gas temperature in the drawing chamber.

If the source of heat is constructed as a burner ring, the same causes the gases to be introduced into the drawing chamber in an eddying current.

The supply of the highly heated gases is effected preferably by the incorporation of the sources of heat 10 in the metal shields 8, at the height of the inspection windows 9, in such a manner that they flow substantially between the coolers 7 and the walls of the drawing chamber, and above the coolers 7 between the glass sheet and the walls of the chamber. The introduction of the highly heated gases into the drawing chamber is effected at such speeds and in such amounts that, as far as possible, the whole cross-section of the drawing chamber is traversed at least the length of the slot 3, of the débiteuse 4.

Instead of the countercurrent principle represented in Figures 1 and 2, use may be made of a flow in the same direction on both the sides of the glass sheet, by arranging the two sources of heat 10 laterally with respect to the inspection window 9 in one and the same metal shield 8.

Figure 4:
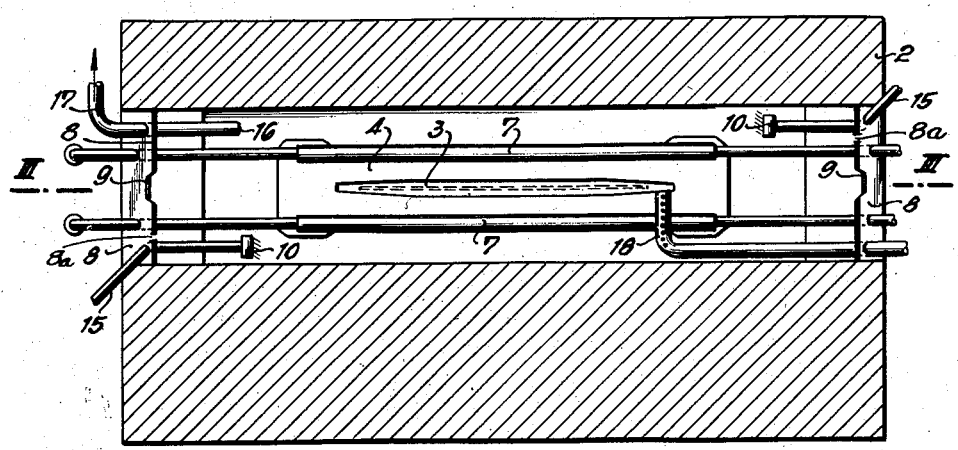
Figure 4 shows the same drawing machine in section along the line IV—IV of Figure 3.

In the machine illustrated in Figures 3 and 4, the sources of heat 10 are mounted within the drawing chamber between the edges of the glass sheet and the metal shields 8. In this case, the gas current is supplied to the sources of heat 10 through pipes 15 which extend through the metal shields 8. The construction of the machine shown in Figures 3 and 4 corresponds in other respects to that shown in Figures 1 and 2.

As can be seen from the upper half of Figure 4, a suction opening 16 is provided on the side of the drawing chamber opposite that of the inlet opening of the highly heated gases, which suction opening draws off the gases after they have passed through the drawing chamber, by means of a pipe 17 which is provided with an exhausting device (not shown). The arrangement of such a suction pipe is advisable, more particularly in the case of large widths of glass sheets, in order to ensure that the highly heated air will be led transversely to the drawing direction of the glass sheet over the entire width of the glass sheet.

Instead of the suction pipe 17 there may be arranged, as is shown in the lower half of Figure 4, in the proximity of the edge of the glass sheet which is removed from the source of heat 10, a pipe 18 extending from this edge to preferably the wall of the drawing chamber, through which pipe the preferably heated gases flow out vertically upwards. This vertically upwardly flowing gas current strengthens the suction on the highly heated gases flowing transversely to the drawing direction of the glass sheet, and has the effect that the same is caused to flow likewise along the whole width of the glass sheet. The vertically ascending gas current may be constituted by the combustion gases of a flame pipe or by gases issuing from a slotted pipe.

Also in the case of the construction shown in Figures 3 and 4, the sources of heat may consist of burner rings, such as shown in Figures 5 and 6.

We claim:

1. Apparatus for reducing waves in a glass sheet drawn upwardly from a bath of molten glass through a drawing chamber which is closed at its narrow sides, said apparatus comprising a member having a slot therein, means for drawing glass upwardly from said slot, a cooler spaced above said member, parallel with and at each side of said slot, burners located in said drawing chamber at a greater distance from the vertical axis of symmetry of the sheet than are the edges of said sheet, said burners being located beyond the ends of said coolers, and means for supplying a stream of air to be heated to each of said burners, each of said burners being adapted to produce a ring of flames surrounding said stream of air to be heated, the flames of said ring being inclined to the direction of flow of the stream of air to be heated so that said flames have an injector effect on said streams of air, said burners being positioned to cause said heated streams of air to flow transversely to the directoin of movement of the sheet and across the whole width of the sheet and on each side thereof.

2. Apparatus according to claim 1, comprising an outlet pipe extending from the vicinity of the edge of the glass sheet to the drawing chamber wall, said outlet pipe having upwardly directed outlets therein, and means for flowing gas through said outlets to produce a current of gas flowing vertically upwards.

References Cited in the file of this patent

UNITED STATES PATENTS

| 307,829 | Anderson | Nov. 11, 1884 |
| 1,726,114 | Morton | Aug. 27, 1929 |
| 2,116,693 | Bishop | May 10, 1938 |
| 2,246,053 | Magrini | June 17, 1941 |
| 2,287,136 | Rolland et al. | June 23, 1942 |
| 2,519,457 | Halbach et al. | Aug. 22, 1950 |

FOREIGN PATENTS

| 659,256 | Great Britain | Oct. 17, 1951 |
| 102,275 | Australia | Oct. 17, 1937 |